United States Patent Office 2,806,823
Patented Sept. 17, 1957

2,806,823
PROCESS OF PREPARING CELLULAR RUBBER AND COMPOSITIONS THEREFOR

Frank A. V. Sullivan, Glenbrook, Conn., assignor to American Cyanamid Company, New York, N. Y., a corporation of Maine No Drawing. Application December 14, 1954, Serial No. 475,268

8 Claims. (Cl. 260—2.5)

The present invention relates to cellular polymeric materials. More particularly, it relates to foam and cellular rubber and plastic materials. Still more particularly, it relates to a method of preparing such cellular polymeric materials using a new class of blowing agents comprising N,N'-alkylenebisbenzosulfotriazines.

In the manufacture of cellular polymeric products, any of various chemical compounds known as blowing agents are incorporated into an uncured polymeric material. The resultant mixture is then subjected to curing at an elevated temperature at which temperature gas is liberated from the blowing agent. The gaseous decomposition product thus released "blows" the polymeric material forming minute cells throughout.

Not all chemical compounds which decompose on heating to a gaseous product are necessarly satisfactory for use in the manufacture of cellular rubber and foam plastic masses. There are certain properties which a material must possess to render it a successful blowing agent. For instance, although a blowing agent must be unstable at the treating temperature, it should be stable on storage, shipment and handling. On the other hand, it should not be so unstable at the treating temperature as to decompose explosively. A blowing agent must disperse evenly or dissolve in the polymeric material to permit formation of fine uniform cells rather than coarse cells or even large cavities. It should be nontoxic and odorless as should its decomposition product.

In the manufacture of cellular rubber, decomposition of the blowing agent should not occur until vulcanization has partially proceeded so that the rubber stock has sufficient strength to retain the gaseous decomposition product. Decomposition, however, must occur before vulcanization proceeds to an extent such that cell formation is restricted. Complete evolution of gas should occur prior to completion of vulcanization to produce a blown product of as low density as possible. Still further, the blowing agent must not interfere with rubber vulcanization accelerators or other additives, or itself accelerate or retard the vulcanization process.

In the past, both inorganic and organic compounds have been employed as blowing agents. As representative of the former might be mentioned ammonium carbonate, sodium nitrite, sodium bicarbonate and the like. Among the organic compounds which have been found successful to varying degrees are, for example, urea and some of its derivatives, various diazoamino derivatives and certain azonitrile and azodicarboxylic derivatives. Certain hydrazine derivatives of organic sulfonic acids have been found to be particularly promising. Nevertheless, they all lack to varying degrees in one or more of the desired characteristics noted above.

It has now been found in accordance with the present invention, that cellular products of excellent characteristics may be obtained by using as blowing agents N,N'-alkylenebisbenzosulfotriazines. These compounds may be represented by the formula:

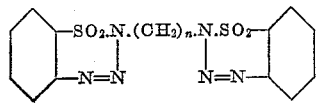

in which $n$ may be quite widely varied but is preferably an integer from 1 to 4, and in which the benzene nuclei may be substituted by halogens and lower alkyl and alkoxy radicals.

The N,N'-alkylenebisbenzosulfotriazines employed in the process of this invention may be prepared by diazotizing an alkylenebis-(2-aminobenzenesulfonamide) in the usual manner. Upon completion of the diazotization reaction, the product may be isolated by making the solution alkaline with sodium carbonate, filtering off the precipitated product, washing with water and drying.

The amount of blowing agent employed in accordance with this invention will vary according to the type of product to be blown as well as the degree of blow desired. Thus in the manufacture of cellular rubber products, whether natural rubber or synthetic polymers and copolymers such as polymerized butadiene 1,3, copolymerized butadienestyrene, butadiene-acrylonitrile and the like, as little as 0.5% by weight on the rubber may be employed. Products of decreasing densities are obtained using greater amounts of blowing agent. In general, the amount of blowing agent employed in the manufacture of cellular rubber will vary from about 0.5% to about 5% on the rubber, usually between about 1% and 3%. In the manufacture of cellular plastic materials, such for instance, as urea-aldehyde resins, phenolaldehyde resins, vinyl polymers and the like, the amount of blowing agent will generally be greater than that necessary in rubber. In general, this amount will run from about 10% to about 30% by weight on the resin, depending again on the particular blowing agent, the resin to be blown, the degree of blow and the like.

Preparation of the blowing agents of this invention is illustrated by the following examples. Unless otherwise specified, all parts are by weight.

EXAMPLE 1

*N,N'-ethylenebisbenzosulfotriazine*

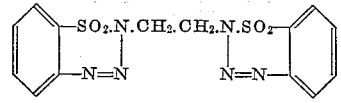

24 parts of N,N' - ethylenebis(2 - aminobenzenesulfonamide hydrochloride) is suspended in 150 parts of 6 N $H_2SO_4$ and the suspension chilled to 3° C. A solution of 8.4 parts of $NaNO_2$ in 50 parts of $H_2O$ is then dripped into the chilled suspension. As diazotization proceeds the suspension thins and at its completion a small amount of insoluble material is filtered off. The filtrate is then made alkaline with $Na_2CO_3$ and a solid product precipitates. After separation by filtration and washing, the crude material is recrystallized from dioxane to give a yellow crystalline product, M. P. 150–152° C. with decomposition.

EXAMPLE 2

*N,N'-trimethylenebisbenzosulfotriazine*

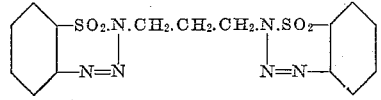

22.85 parts of N,N' - trimethylenebis(2 - aminobenzenesulfonamide hydrochloride) is suspended in 150 parts of 6 N $H_2SO_4$ containing a drop of Ultrawet 30 DS. The reaction mixture is chilled to 3° C., an aqueous solution containing 8.4 parts of $NaNO_2$ added dropwise at 3–5° C. and the mixture stirred for 0.5 hr. at 0–5° C. An aqueous $Na_2CO_3$ solution is then added until the mixture is alkaline. The precipitated product is filtered off, washed and dried. On recrystallization from dioxane the product melts at 140–142° C. with decomposition.

EXAMPLE 3

*N,N'-tetramethylenebisbenzosulfotriazine*

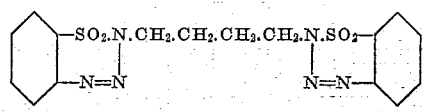

23.5 parts of N,N' - tetramethylenebis(2 - aminobenzenesulfonamide hydrochloride) is suspended in 150 parts of 6 N $H_2SO_4$ and the mixture chilled to 3° C. An aqueous solution containing 8.4 parts of $NaNO_2$ is then added dropwise at 3–5° C. and the mixture stirred at 0–5° C. for one-half hour. An aqueous $Na_2CO_3$ solution is then added until the mixture is alkaline. The precipitated product is filtered off, washed and dried. The product is then recrystallized from dioxane, M. P., 128–130° C. with decomposition.

The following examples illustrate the process of this invention. Again, all parts are by weight unless otherwise noted.

In each example, samples of each stock are blown at 153° C. for 35 minutes and 130° C. for 60 minutes. The mold load is 6 cubic inches and both high and low loads are blown at each temperature for each stock. In the case of white stock, the respective portions for high and low loads are 51 grams and 42 grams, while for neutral colored stock, they are 48.5 grams and 40 grams.

In order to simplify the examples, the following abbreviations are employed:

Compounds:
  MBTS—bisbenzothiazoledisulfide
  DOTG—di-o-tolylguanidine
Degree of blow:
  C—complete
  SRC—nearly complete, corners slightly rounded
  RC—corners rounded
Cell structure: F—fine

EXAMPLE 4

Two rubber stocks, one containing p,p'oxybis(benzenesulfonyl hydrazide), one of the more successful of the commercially available blowing agents, and the other containing N,N'-ethylenebisbenzosulfotriazine, a blowing agent according to the present invention, are compounded according to the following composition:

| Compound | Parts |
| --- | --- |
| Plasticized Smoked Sheet | 100 |
| 2,2'methylene-bis(4-methyl-6-t-butylphenol) | 0.5 |
| Stearic Acid | 2 |
| Sulfur | 3 |
| Petrolatum | 3 |
| Keystone Whiting | 50 |
| Light Process Aid | 10 |
| Zinc Oxide | 5 |
| MBTS | 0.6 |
| DOTG | 0.15 |
| Blowing Agent | 1.5 |

Samples of each stock are blown as described above. Results are recorded in Table I.

TABLE I

| Blowing Agent | Blown at 130°C. for 60 min. | | | | Blown at 153°C. for 35 min. | | | |
| --- | --- | --- | --- | --- | --- | --- | --- | --- |
| | Low Load (40 g.) | | High Load (48.5 g.) | | Low Load (40 g.) | | High Load (48.5 g.) | |
| | Blow | Cells | Blow | Cells | Blow | Cells | Blow | Cells |
| p,p'-oxybis(benzenesulfonylhydrazide) | RC | F | C | F | SRC | F | C | F |
| N,N'-ethylenebisbenzosulfotriazine | SRC | F | C | F | SRC | F | C | F |

The data of Table I shows that the N,N'-ethylenebisbenzosulfotriazine of this invention produces as complete a blow and a product having as uniform and fine cell structure as that obtained with the excellent, commercially available, p,p'-oxybis(benzene sulfonylhydrazide).

EXAMPLE 5

Example 4 was repeated except 1.64 parts of N,N'-ethylenebisbenzosulfotriazine was employed. This provided an active nitrogen equivalent to that present in p,p'-oxybis(benzene sulfonylhydrazide). Results are shown in Table II.

TABLE II

| Blowing Agent | Blown at 130°C. for 60 min. | | | | Blown at 153°C. for 35 min. | | | |
| --- | --- | --- | --- | --- | --- | --- | --- | --- |
| | Low Load (42 g.) | | High Load (51 g.) | | Low Load (42 g.) | | High Load (51 g.) | |
| | Blow | Cells | Blow | Cells | Blow | Cells | Blow | Cells |
| p,p'-oxybis(benzene sulfonylhydrazide) | RC | F | C | F | SRC | F | C | F |
| N,N'-ethylenebisbenzosulfotriazine | C | F | C | F | C | F | C | F |

The results of Table II indicate that when using an amount of N,N'-ethylenebisbenzosulfotriazine sufficient to provide an active nitrogen content equivalent to that in a predetermined amount of p,p'-oxybis(benzene sulfonylhydrazide), it is possible to obtain a superior blown product.

What is claimed is:

1. A process of producing a cellular rubber product selected from the group consisting of natural rubber and rubber-like polymers of butadiene-1,3 which comprises incorporating into an unvulcanized, vulcanizable rubber composition a compound of the formula

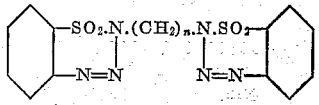

in which $n$ is an integer from 1 to 4, and curing the composition.

2. A process according to claim 1 in which $n$ is 2.
3. A process according to claim 1 in which $n$ is 3.
4. A process according to claim 1 in which $n$ is 4.
5. An unvulcanized, vulcanizable rubber composition selected from the group consisting of natural rubber and rubber-like polymers of butadiene-1,3 having incorporated therein a compound of the formula

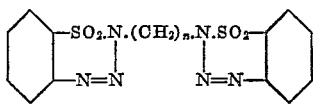

in which $n$ is an integer from 1 to 4.

6. A composition according to claim 5 in which $n$ is 2.
7. A composition according to claim 5 in which $n$ is 3.
8. A composition according to claim 5 in which $n$ is 4.

References Cited in the file of this patent
UNITED STATES PATENTS 2,588,885    Schlessinger _____ Mar. 11, 1952